Figure 1:
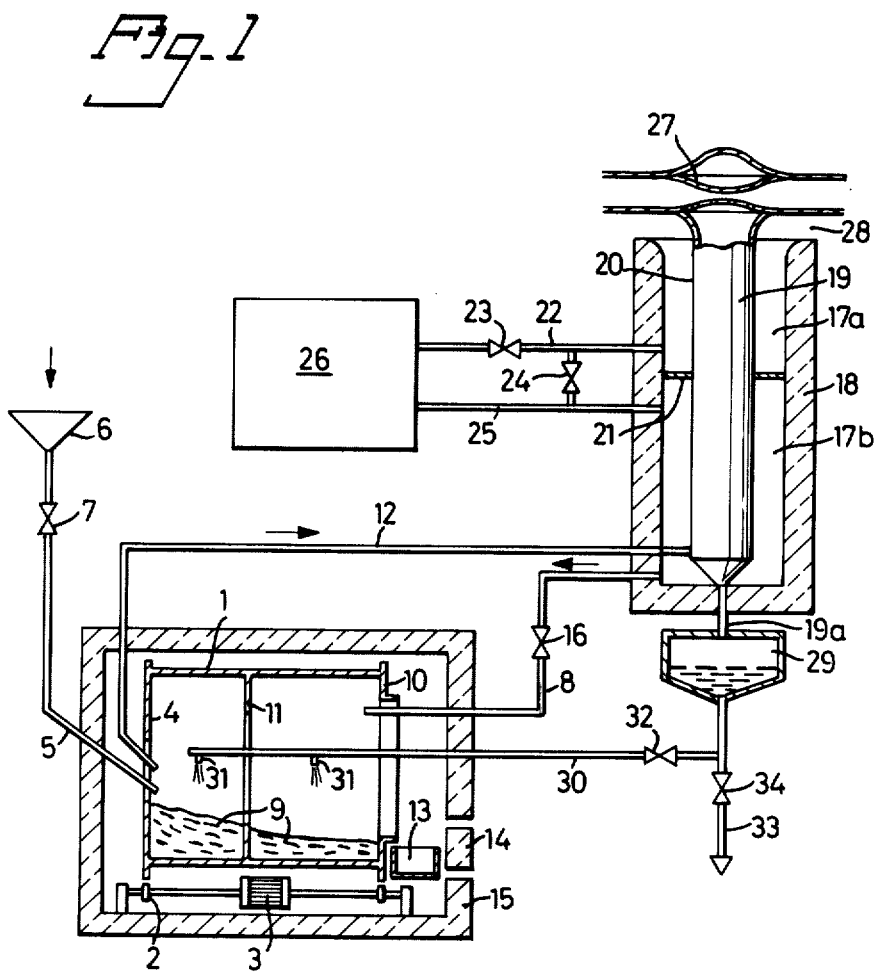

United States Patent

Romell

[11] 3,892,660
[45] July 1, 1975

[54] METHOD OF RENDERING DECAY PROCESSES MORE EFFECTIVE

[76] Inventor: Dag Romell, 10, Ynglingavagen, Djursholm, Sweden

[22] Filed: Apr. 16, 1973

[21] Appl. No.: 351,267

[30] Foreign Application Priority Data
Apr. 4, 1973 Sweden .......................... 7304771

[52] U.S. Cl. ...................... 210/12; 210/15; 210/14
[51] Int. Cl. ............................................. C02c 1/14
[58] Field of Search.... 210/152, 177, 175, 178–181, 210/12, 151, 2, 15, 3, 14, 63; 4/10, 131, 118

[56] References Cited
UNITED STATES PATENTS

| | | | |
|---|---|---|---|
| 3,368,967 | 2/1968 | Weaver et al. | 210/12 |
| 3,607,737 | 9/1971 | Garner | 210/180 |
| 3,622,511 | 11/1971 | Pizzo et al. | 210/152 |

*Primary Examiner*—Thomas G. Wyse
*Assistant Examiner*—Benoit Castel

[57] ABSTRACT

Method for rendering decay processes more effective in the decaying of organic waste products, in which waste products are introduced into a container to be exposed in a decaying zone to a decay process at elevated temperature, while supplying air to deliver gaseous oxygen for maintaining an exothermic decaying process in said decaying zone, and removing air from the decaying zone after having been brought to an elevated temperature by said exothermic process, including supplying air to deliver gaseous oxygen to the decaying process, and removing the air from the decaying zone after having been brought to an elevated temperature by heat generated in the decaying process by being passed through a heat exchanger comprising walls adapted to transfer heat from the removed air to the supplied air, and to mutually separate flows of removed air and supplied air.

1 Claim, 3 Drawing Figures

METHOD OF RENDERING DECAY PROCESSES MORE EFFECTIVE

Destructing systems for feces, urine, garbage, and other waste products are known since long. The function of such a system may briefly be described as follows: cellulose and other high-energy organic material, mainly in the form of garbage, paper and refuse, is destructed by microbiological and enzymatic processes in a milieu favouring such processes. Such a millieu is created by the presence of moisture, in particular moisture originating from urine, by nutrient salts etc. of faeces and urine, as well as by oxygen applied in the form of air. In such processes faeces as well is destructed, the final product being non-odorant mull.

A provision for such a system to function in a desired manner is that the heat liberated during the destructing processes covers the heat demand for evaporating urine and other moisture, while as well covering external heat losses. In practice, these premises are mostly only just fulfilled, in consequence whereof a conventional decaying system functions very close to, and in some inconvenient cases passes, a critical limit where the function of the system ceases.

Further, a conventional decaying system has the disadvantage of being rather voluminous, such as, for instance, 5 m³ (150 cu.ft.) for a normal household, this caused in part by the fact that the main part of the decay process is concentrated to a small fraction only of the total volume of the apparatus, in part by the comparatively low temperature at which the process proceeds, as an average at about 25 to 30°C (in the most active zone).

A more convenient system may be provided for by, first, diminishing or eliminating such part of the apparatus volume within which an effectively proceeding decay does not take place, second, by conducting the process at higher temperature. By such measure the speed of decay can be increased considerably, in that a temperature increase of about 7°C at normal ambient temperature doubbles the speed of destruction, leading to a corresponding increase of the destruction capacity of the system. This, in its turn, leads to a possibility to decrease the volume of an apparatus capable of taking care of a specific quantity of waste material. Thus, an increase of working temperature from, for instance, 28°C to about 65°C, makes possible a decrease of the active parts of an apparatus to only about 3 percent of the volume required for taking care of the waste at a working temperature of 28°C.

The present invention is in respect of a method by the use of which it is made possible to conduct the decaying process in a manner that the decaying process proceeds with a high speed as compared with hitherto conventional decaying systems which do not make use of means for a delivery of external heat to the decaying process, and which provides for a high efficiency of the decaying process making possible a restriction of the volume required for taking care of one and the same quantity of waste material without a necessity, as a rule, to supply external heat, such as by means of electric radiators or the like.

Thus, the invention is in respect of a method of rendering more efficient the decaying process in a system for destructing organic waste, in which the waste material is introduced into a receptacle in which it is exposed to a decaying process at elevated temperature caused by heat substantially generated in the decaying process, while supplying oxygen required for the decaying process by supplying air and removal of a corresponding quantity of air which has been brought to an elevated temperature by passing the decaying zone of the system. According to this invention air which is supplied to provide oxygen required for the decaying process and air removed from the decaying zone of the system after having been heated therein are conducted through a heat exchanger for transferring heat from air leaving the zone to the air entering the zone.

In a preferred embodiment of the method the heat exchange in the heat exchanger is conducted, by controlling the quantity of air passing the heat exchanger and thus the decaying zone of the system as well, in such a manner that humidity vaporized in the decaying zone of the system and leaving the zone carried by air leaving the decaying zone at elevated temperature is condensed in the heat exchanger, from which water, which is thus condensed out in the heat exchanger, is collected, the evaporization heat of such condensed water thus being utilized for heating fresh air entering the decaying zone. Such water may, if required for the decaying process, be recirculated to the decaying zone, or otherwise used for other purpose as being a water of comparatively high purity.

When conducting the process as last described, the inflow of fresh air may be cut down radically, and this to values of in the neighbourhood of the minimum required with respect to the oxygen supply necessary for the decaying process. Such radically diminished quantity of air supplied to the process leads to the possibility of a corresponding decrease of the volume and heat transfer surfaces of the heat exchanger. Further, the cooling influence of the fresh air on the material exposed to the decaying process will be diminished, and the air leaving the decaying zone obtain a higher temperature, this increasing the efficiency of the heat exchanger.

The possibility of recycling water which has been condensed-out in the heat exchanger to the decaying zone of the system, brings specific advantage in such cases where urine is to be destructed in the system. Urine, which has been brought to high concentration by evaporation of water, may destroy organisms necessary for the decaying process. By recycling part of the condensed-out water, this risk is substantially avoided. Of course, as the case may be, other corresponding water quantities may be added to the decaying process, but in any case condensing out of humidity present in air leaving the system provides for a substantial increase of the heat efficiency of the system.

Further, the situation may arise in a system in which the decaying process proceeds at a considerably elevated temperature, that the mass under treatment loses too much moisture for the process to proceed in an optimal manner. In such case as well, water collected from air under elevated temperature leaving the decaying zone and the heat of which has been transferred to air entering the process is recirculated to the process to provide a moisture content therein, at which the decaying process proceeds with high efficiency.

Obviously, it will depend on the quantity of water supplied to the decaying zone with waste material introduced therein, whether a surplus of water will be condensed-out in the heat exchanger, or whether, as may be the case when the waste material is comparatively dry, whether in addition to condensed water additional water should be supplied to the decaying zone to provide for optimal condition for destructing the waste.

From what is said above it is evident that the heat losses to surroundings, that is, heat not leaving the decaying zone with air passing the heat exchanger, should be kept as low as possible, for which purpose external walls of such apparatus should preferably comprise a satisfactory heat insulation. In such cases where waste material with a comparatively high moisture content is to be expected, some kind of external heat supply may be of advantage or even necessary to obtain an optimal development of the decaying process.

Due to the fact that by use of a heat exchange between air at elevated temperature leaving the decay zone and fresh air supplied to it, the heat efficiency of the system is so high that in most cases a surplus of heat is, as a principle, available for other use, the invention relates as well, in an embodiment thereof, to a system in which fresh air after having passed the heat exchanger or part thereof is withdrawn from the heat exchanger at a selected temperature level to be ejected into a room of a building served by the system, to deliver part of its heat content to the room, and then again withdrawn from the room and returned to the system, still at a higher heat energy level than the fresh air entering the heat exchanger, to pass further on to the decaying zone of the apparatus.

Figure 2:
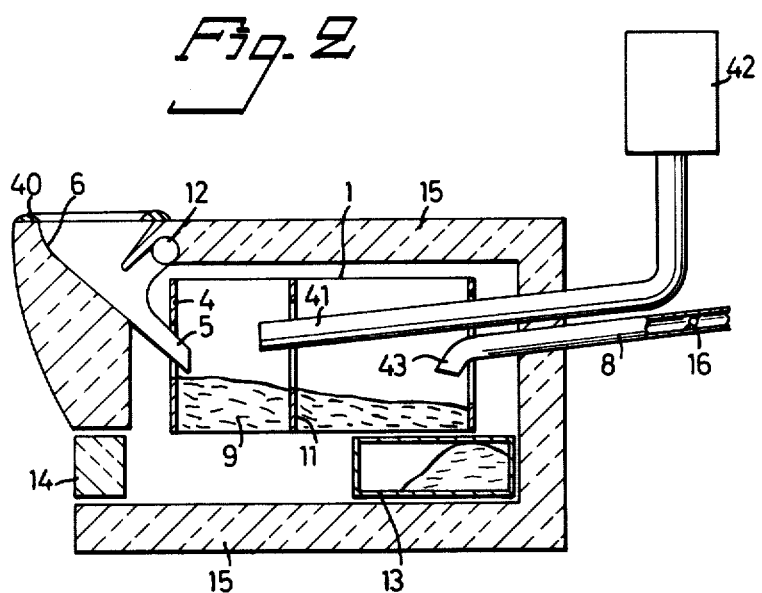
Figure 3:
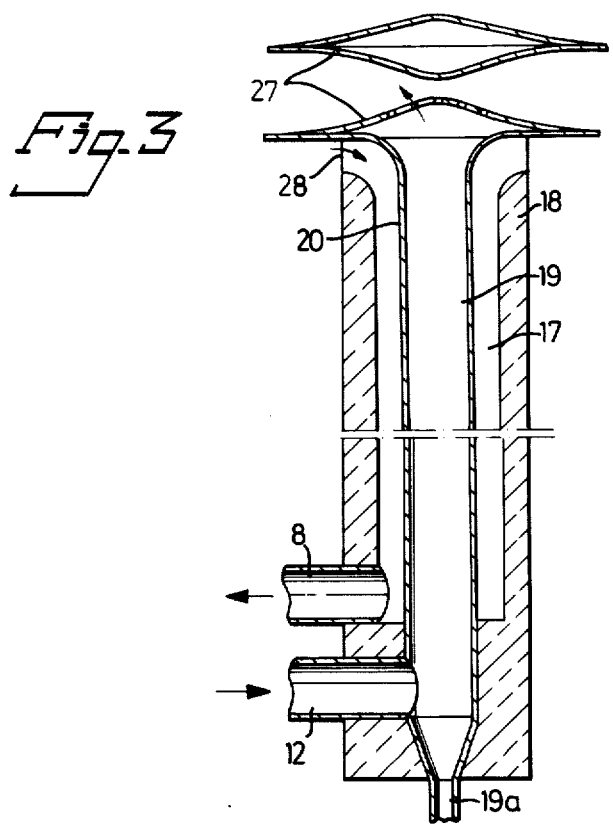

The invention will be more closely illustrated by the following description with reference to the accompanying drawings, in which FIG. 1 represents a flow diagram of a waste material destructing system according to the invention, FIG. 2 a schematic view of part of a system according to the invention comprising, as a unit, a toilet stool and means enclosing the waste material destructing zone of the system, as well as means for supplying other waste material to be treated, and air necessary for the decaying process, and FIG. 3 illustrates a simple embodiment of a heat exchanger combined with an apparatus as illustrated in FIG. 2 in a system according to the invention.

In a system as illustrated diagrammatically by FIG. 1, 1 is a cylinder enclosing the material decaying zone of the system, illustrated as being rotatable about its longitudinal axis, as illustrated in FIG. 1 extending horizontally, on rollers 2 driven by a motor 3, in a manner known per se for destructive systems of the kind to provide for a slow stirring of the waste material. Waste material is introduced into the cylinder through a central opening in one end-wall 4 of the cylinder, by means of a duct 5 of appropriate diameter from a receptacle 6 for waste material. A hindrance for air to escape from the destructing zone of the apparatus to the ambient atmosphere is symbolized by a valve symbol 7. A conduit 8 supplying fresh air to the decaying zone within the cylinder opens into the cylinder adjacent the second end-wall 10 thereof through a central opening in this wall.

Air introduced into the cylinder 1 through conduit 8 passes, while delivering oxygen to the decaying process which takes place within the cylinder, through the cylinder to leave the cylinder adjacent the end 4 thereof through a conduit 12. While passing the cylinder the air introduced through conduit 8 takes up heat generated during the decay process in the cylinder and takes up moisture in form of vapor generated during the process and thus leaves the cylinder through conduit 12 at a higher temperature level and with higher moisture content than the air entering through conduit 8. According to the invention air introduced to the decaying process and air leaving the process are brought through a heat exchanger, which in FIG. 1 is diagrammatically shown as comprising an inlet channel 17a–17b enclosed by heat insulating material 18 and enclosing a channel 19, through which passes exhaust air entering through conduit 12.

Channel 17a, 17b opens into the ambient air to draw fresh air to the decaying zone of the system. As illustrated, channel 19 for exhaust air from the decaying zone opens into ambient air through a venturi arrangement 27, providing for air circulation through the system. Obviously, other conventional means for impelling the air flowing through the system may be used.

A valve symbol 16 in conduit 8 symbolizes a throttle valve for adjusting the air flow through the system to a level providing optimal condition for the decaying process.

From the bottom of channel 19 of the heat exchanger a conduit 19a leads to a receptacle 29 for water condensing out from warm moist air entering the channel through conduit 12 and delivering its evaporation heat to this wall, the external surface of which is cooled by and delivers heat to fresh air entering channel 17a, 17b.

In dependence of need with respect to conditions prevailing in the decaying zone of the system, water thus condensed out of air from the process may be brought back to the material under treatment, symbolized in FIG. 1 by conduit 30 opening into the decaying zone through nozzles 31 and controlled by a valve 32, or otherwise water condensed out in the heat exchanger is withdrawable through conduit 33 and a valve 34 for external use or as waste water.

As illustrated in FIG. 1, the heat exchanger in the shown embodiment comprises in channel 17a, 17b a partition wall 21, subdividing the channel in two parts having, adjacent the partition wall 21, exit and enterance conduits 22 and 25, respectively, which are mutually connected by a valve 24 allowing an immediate flow of fresh air from the channel portion 17a to the channel portion 17b when open, and a valve 23 allowing, when open, a flow of fresh air from channel portion 17a to a room of a house which is served by the system, such as a toilet room or the like, a corresponding quantity of air being conveyed through conduit 25 from said room to the channel portion 17b for further heating by transfer of heat from exhaust air from conduit 12.

In the embodiments illustrated in FIG. 1 and 2, the cylinder 1 is, in its longitudinal direction, divided up in two compartments, separated by a wall 11 having a central opening allowing material contained in the cylinder to pass on from the front compartment, as seen in the direction from conduit 5 for the supply of waste material to the cylinder, to a rear compartment, from which the waste material after having been destructed to form a mull is passed on to a container 13 for the mull, the container being accessible through a door 14 in a heat insulated casing 15 enclosing the cylinder.

In the embodiment of the waste destruction part of the system illustrated in FIG. 2, said part is combined with a closet stool 6, which is combined with the casing 15 as a unit, and communicates with the front chamber of a cylinder 1 of the kind described in connection with FIG. 1, the conduit 5 extending through a front wall 4 of the cylinder through a central opening therein.

Fresh air from the surrounding atmosphere is supplied to the rear end of the cylinder after having passed a heat exchanger, of which an embodiment with straight-through flow of the entering air is illustrated by FIG. 3, through conduit 8, which terminates within the cylinder in a downward bend 43 to direct the entering air toward the material at the rear end of the cylinder mainly consisting of mull after having passed the cylinder.

Further, the system comprises a garbage mill 42 from which garbage after milling is supplied to the front compartment of the cylinder through conduit 41.

Conduit 12 extends in the apparatus illustrated by FIG. 2 from the conduit 5 to the heat exchanger for delivering heat to air entering the system. By proper choice of means for maintaining a flow of air at a rate selected by aid of a throttle valve 16, for instance, a pressure below ambient pressure may be maintained within the cylinder and the casing, so as to avoid inconvenience when a lid 40 of the stool is opened.

The two compartments of cylinder 1, the one in front of partition wall 11 and the one rearwardly thereof fulfill generally dissimilar tasks. The major part of the decay proceeds in the first compartment, to which the waste material is introduced and toilet and kitchen waste mixed with each other, the moisture content in this compartment being maintained at a level favouring an intensive decaying process. In the second compartment, the material will successively be transferred to a dryer state to finally, when leaving the cylinder, be so dry as to be conveniently handled.

While this invention has been described with respect to specific examples thereof, it should not be construed as being limited thereto. Various modifications and substitutions will be obvious to everyone skilled in the art and can be made without departing from the scope of this invention.

What I claim is:

1. Method of rendering decay processes more effective in an apparatus for providing decaying of organic waste products, including introducing waste products into a container having a decaying zone for exposure to a decay process at above ambient temperatures, supplying air to said decaying zone so as to provide gaseous oxygen for maintaining an exothermic decaying process in said decaying zone, and removing said air from the decaying zone after having been brought to above ambient temperature by said exothermic processes, the improvement comprising: passing said air supplied to deliver gaseous oxygen to said decaying process and said air removed from said decaying zone after having been brought to above ambient temperature by heat generated in said decaying process through a heat exchanger; transferring heat from said removed air to said supplied air in said heat exchanger while separating flows of removed air and supplied air; condensing vapor generated during said decaying process and leaving said decaying zone together with air removed from said zone on the walls of said heat exchanger by restricting the quantity of said air supplied to the decaying zone, said air supplied to said decaying zone after having been heated by heat exchange with air removed from said decaying zone to above ambient temperature in a first part of said heat exchanger being conveyed to an enclosed space of a building for heat exchange with air contained in asid space, air from said space being conveyed to a second part of said heat exchanger for exchange of heat between air removed from said decaying zone and subsequently conveyed to said decaying zone to deliver gaseous oxygen for maintaining said exothermic decaying process; feeding said organic waste products into a vessel at one end thereof; conveying said waste products through said vessel while exposed to said decaying process towards an opposite end of the vessel for removal therefrom; introducing fresh air which is heated to above ambient temperature by heat supplied by said air removed from the decaying zone into the vessel adjacent said lastmentioned opposite end of the vessel; removing said air after having been brought to above ambient temperature by heat originating from said exothermic decaying process at said firstmentioned end of the vessel; and conveying said air to said heat exchanger for delivering heat to said air supplied to the decaying zone.

* * * * *